Jan. 27, 1925.  1,524,083
C. G. CLEMENT
DUPLEX JACK FOR SEMITRAILERS
Filed March 20, 1920
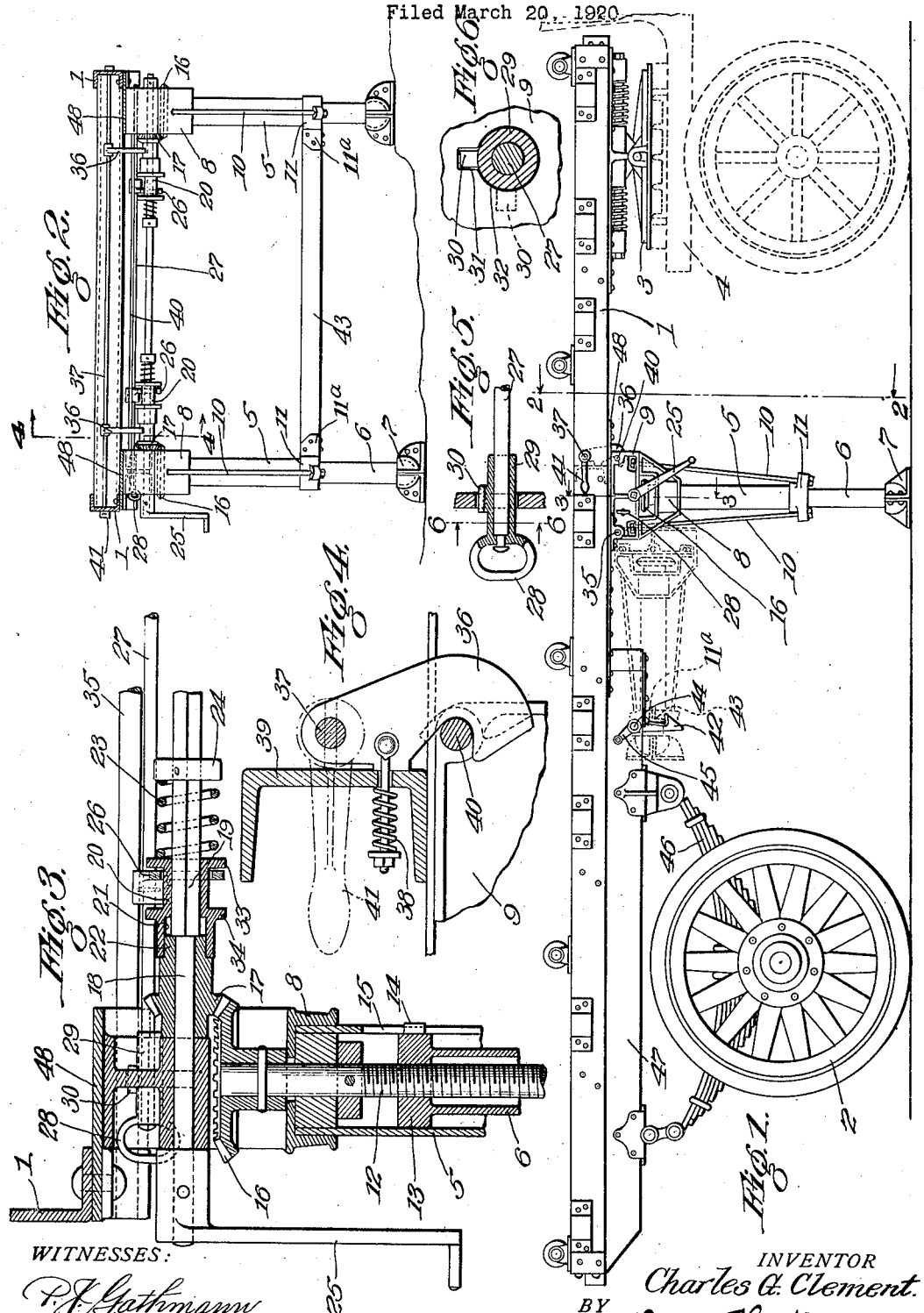
WITNESSES:
P. J. Gathmann
INVENTOR
Charles G. Clement.
BY
Burton & Burton
HIS ATTORNEYS Patented Jan. 27, 1925.

1,524,083

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

DUPLEX JACK FOR SEMITRAILERS.

Application filed March 20, 1920. Serial No. 367,508.

*To all whom it may concern:*

Be it known that I, CHARLES G. CLEMENT, a citizen of the United States, and a resident of Edgerton, in the county of Rock and State of Wisconsin, have invented certain new and useful Improvements in Duplex Jacks for Semitrailers, of which the following is a specification, reference being had to the accompanying drawings, forming a part thereof.

This invention relates to a vehicle known as a semi-trailer in which the body is supported on two wheels and is detachably connected by a fifth wheel or turn-table to a tractor vehicle. The invention is designed to provide improved supports for the trailer, supplementing its two wheels when the trailer is detached from the tractor vehicle, and it consists in the features and elements of construction hereinafter described and shown in the drawings, as indicated by the claims.

In the drawings:

Figure 1 is a side elevation of a semi-trailer embodying this invention, showing in dotted outlines the rear portion of a tractor vehicle with which the trailer may be connected.

Figure 2 is substantially a transverse vertical section, taken as indicated at line, 2—2, on Figure 1.

Figure 3 is a detail section taken as indicated at line, 3—3, on Figure 1.

Figure 4 is a detail section of a locking hook taken as indicated at line, 4—4, on Figure 2.

Figure 5 is a detail section of a clutch shifter for the supporting jacks, being taken as a vertical section through the axis of the clutch shifter rod.

Figure 6 is a section taken as indicated at line, 6—6, on Figure 5.

As seen in Figure 1, the trailer to which this invention is applied, comprises a horizontal frame, 1, with supporting road wheels, 2, disposed toward the rear end of the frame, while the forward end is equipped with a fifth wheel, 3, of which one of the co-operating elements is mounted on the tractor vehicle, indicated in dotted lines at 4, so that by separation of the fifth wheel members the semi-trailer can be detached from the tractor vehicle and left standing for loading or unloading while the tractor is used for other work. For supporting the forward end of the frame when the tractor vehicle is thus removed, there are provided a pair of jacks disposed at opposite sides of the frame, 1, respectively, and each comprising a tubular member 5, and a sleeve, 6, therein, fitted at its lower end with a footpiece, 7, preferably connected by a spherical joint so as to accommodate itself to any unevenness in the ground. The tubular member, 5, is provided with a cap, 8, which is shown as a casting surmounted by another casting, 9, to which it is secured by strain rods, 10, extending downwardly into a fitting, 11, at the lower end of the tube, 5.

A jack screw, 12, is journaled in the upper end of the tube, 5, and engages a nut, 13, rigidly associated with the upper end of the sleeve, 6, the nut being formed with a lug, 14, adapted to slide in a vertical slot, 15, in the tube, 5, as the jack screw, 12, is rotated for feeding the telescoping sleeve, 6, up or down with respect to the tubular frame member, 5. The upper end of the jack screw, 12, is provided with a bevel gear, 16, meshing with a bevel pinion, 17, loosely carried around a portion of the shaft, 18, while a square portion of said shaft indicated at 19, carries a clutch member, 20, having a square or otherwise non-circular socket to fit a correspondingly-shaped portion, 22, of the hub, 17, for driving said pinion when the shaft, 18, is rotated. Engagement of the clutch socket, 21, with the part, 22, is normally maintained by a spring, 23, coiled about the shaft, 19, and re-acting against a collar, 24, thereon. And at one side of the vehicle the shaft is provided with an operating crank, 25.

As indicated in Figure 2, it frequently happens that a portion of the road-way directly under the auxiliary support or jack is not in the same plane with that part of the road under the wheels, 2, and it would be desirable to have one of the jacks extended less than the other so that each get a proper share of the load. But since the two jacks are both operated by rotation of the same shaft, 18, special provision must be made to get this result. This is the purpose of the disengageable clutches, 20, which are provided for the individual jacks at the respective sides of the trailer. A clutch shifter fork, 26, is associated with each of the clutch members, 20, and said forks are carried by a common shifter rod, 27, extending across the vehicle. The end of the rod adjacent the operating crank, 25, is provided with a swiveled handle, 28, whose sleeve or hub, 29, is formed with a key, 30, which is normally acommodated in a notch, 31, extending radially from the aperture, 32, in the web of the casting, 9, through which the handle projects. As seen in Figures 2 and 3, the shifter forks, 26, both stand normally adjacent the flanges, 33, of the respective clutch members, 20, with a considerable space separating them from the flanges, 34. Thus the movement of either of the forks, 26, inwardly,—that is, toward the middle of the trailer frame, will disengage its clutch, 20, from the pinion, 17, of its jack, but such movement of one fork will be accompanied by a movement of the other fork away from the flange, 33, of clutch, 20, and toward the flange, 34, without affecting the engagement of that clutch whatsoever. Thus the clutches may be disengaged independently of each other, either by drawing out the handle, 28, from its normal position shown in Figure 3, or by pushing it in from such position, and temporarily retaining the shifter rod at either limit by twisting the handle to move its key or lug, 30, out of registration with the notch, 31, to the position shown in dotted lines in Figure 6, engaging one face or the other of the web of the casting, 9. It may be understood that before the tractor vehicle is detached from the forward end of the trailer, both jacks are operated by the crank, 25, until one of them touches solid ground. Then by means of the handle, 28, the clutch of this jack will be disengaged and the other jack can be operated alone until it also reaches a solid footing. The shifter handle, 28, being then returned to its normal position, both clutches will be engaged, and the trailer frame can be elevated or lowered at will by simultaneous operation of the two jacks.

To permit convenient disposal of the jacks when they are not in use, they are preferably hinged to the trailer frame by means of pivotal connections at 35, and while in position of use they are locked in place by locking hooks, 36, preferably carried on a rock shaft, 37, extending across the frame, and each being provided with a spring yieldingly holding the hook in position abutting the cross member, 39, of the frame, and for engagement with a transverse connecting rod, 40, extending between the castings, 9, of the two jacks. When the trailer has been attached to the tractor vehicle and the jacks are no longer needed for support, the hooks, 36, are disengaged from the rods, 40, by pressure on a handle, 41, provided at the same side of the frame as the operating crank, 25, and clutch shifter handle, 28; and the jacks may then be swung to horizontal position indicated in dotted lines in which they are retained by hooks, 42, positioned to engage the transverse angle bar, 43, which connects the two jacks by attachment to lugs, 11ª, formed on the fittings, 11. The hooks, 42, are also assembled upon a common rock shaft, 44, which is provided with a handle, 45, by which the hooks may be simultaneously disengaged when the jacks are again required for service. In explanation of Figure 1, it may be stated that the vehicle springs, 46, are connected to a sub-frame, 47, of somewhat less width than the main frame, 1, so that when the jacks are swung up to dotted line position shown in this figure of the drawing, they will lie alongside the members of the sub-frame, 47, under the frame members, 1. As indicated in Figure 2, the castings, 9, at the upper end of each jack are considerably wider than the flanges of the channel members of the frame, 1, and are not lodged directly under such flanges; but the frame is provided with bearing plates, 48, extending inwardly from the side members and directly over the jacks.

I claim:

1. In a semi-trailer a pair of vertically adjustable supports at the two sides of the frame, resepectively, adjusting means associated with each support, clutch members co-operating with said adjusting means, and a clutch shifter operable from one side of the trailer, said shifter interconnecting the said clutches, whereby the said supports may be operated simultaneously, or each independently of the other.

2. In a semi-trailer a pair of vertically adjustable supports at the two sides of the frame respectively, a common operating shaft provided with a hand crank at one side of the trailer and a pair of clutches connecting said shaft with the adjusting means of the two supports respectively together with a clutch shifter adjacent said hand crank, and operable at will for disengaging either clutch independently of the other.

3. In a semi-trailer a pair of vertically adjustable supports at the two sides of the frame respectively, a common operating shaft and a pair of gears sleeved thereon and respectively constituting parts of the adjusting means for the two supports, a pair of clutches rotatively carried by said shaft aranged to engage said gears respectively and a clutch shifter operable from one side of the trailer adapted for disengaging either of said clutches at will.

4. In a semi-trailer a pair of adjustable supports in the sides of the frame respectively, a common operating shaft and a pair of gears sleeved thereon and respectively constituting parts of the adjusting means for the two supports, a pair of clutch members each formed for driving engagement with one of said gears carried by said shaft for rotation therewith and oppositely slidable thereon for disengagement from the respective gears, yielding means normally holding said clutches in engagement with the gears, shifting means for each clutch member having a one-way connection therewith adapted for disengaging it from the gear and a common operating rod for said shifters provided with a handle at one side of the vehicle movable in either of two opposite directions for disengaging either clutch at will.

5. In the combination set forth in claim 4, means for locking said operating rod at its limit of movement in either direction.

6. In the combination set forth in claim 4, the handle being mounted for swiveling on the operating rod, said rod being mounted for longitudinal movement, a key carried by the handle, and a fixed element with which said key co-operates to lock the operating rod at either limit of its longitudinal movement.

7. In a structure as defined in claim 4, each support having a surmounting casting hinged to the trailer body, said casting providing mountings and journaling means for the shifter operating rod and the operating shaft.

In testimony whereof, I have hereunto set my hand at Edgerton, Wisconsin, this 15th day of March, 1920.

CHARLES G. CLEMENT.